United States Patent
Bravo et al.

(10) Patent No.: US 11,681,798 B2
(45) Date of Patent: Jun. 20, 2023

(54) SECURITY SCREENING OF A UNIVERSAL SERIAL BUS DEVICE

(71) Applicant: KYNDRYL, INC., New York, NY (US)

(72) Inventors: Cesar Augusto Rodriguez Bravo, Alajuela (CR); Rhonda L. Childress, Austin, TX (US); Craig M. Trim, Ventura, CA (US)

(73) Assignee: KYNDRYL, INC., New York, NY (US)

( * ) Notice: Subject to any disclaimer, the term of this patent is extended or adjusted under 35 U.S.C. 154(b) by 424 days.

(21) Appl. No.: 16/669,581

(22) Filed: Oct. 31, 2019

(65) Prior Publication Data

US 2021/0133319 A1    May 6, 2021

(51) Int. Cl.
*G06F 21/55* (2013.01)
*G06F 21/83* (2013.01)

(52) U.S. Cl.
CPC ............ *G06F 21/554* (2013.01); *G06F 21/83* (2013.01); *G06F 2221/034* (2013.01)

(58) Field of Classification Search
CPC ... G06F 21/554; G06F 21/83; G06F 2221/034
USPC ........................................................ 726/23
See application file for complete search history.

(56) References Cited

U.S. PATENT DOCUMENTS

| | | |
|---|---|---|
| 8,171,546 B2 | 5/2012 | Kim |
| 8,214,896 B2 | 7/2012 | Cheong |
| 8,250,263 B2 | 8/2012 | Kim |
| 9,785,771 B1 | 10/2017 | Pratt |
| 9,894,197 B1 | 2/2018 | Bender |
| 9,990,325 B2 | 6/2018 | Hetzler |
| 10,091,203 B2* | 10/2018 | Galloway ............... H04W 4/50 |
| 11,023,575 B2* | 6/2021 | Apvrille .............. G06F 21/6209 |
| 11,250,132 B2* | 2/2022 | Appleboum .......... G06F 21/566 |
| 2002/0143795 A1* | 10/2002 | Fletcher .................... G06F 8/65 |

(Continued)

FOREIGN PATENT DOCUMENTS

| | | | | |
|---|---|---|---|---|
| CN | 105426203 | * | 3/2016 | ......... G06F 9/44505 |
| CN | 105718825 A | | 6/2016 | |

(Continued)

OTHER PUBLICATIONS

"Bad USB, Very Bad USB—LMG Security", Staff Writer at LMG Security, lMGsecurity.com, May 2, 2016, 7 pages, <https://lmgsecurity.com/bad-usb-very-bad-usb/>.

(Continued)

*Primary Examiner* — Dereena T Cattungal
(74) *Attorney, Agent, or Firm* — Dan Housley; Andrew M. Calderon; Calderon Safran & Cole P.C.

(57) ABSTRACT

Universal serial bus (USB) devices are evaluated for access according to characteristics including descriptors and ROM information. Descriptors are cross-references to historic descriptors known to be associated with malicious or approved USB devices. ROM information is analyzed to determine congruity of data. Device drivers and configuration files on the USB device are reviewed for indicators of compromise or threat and assigned a corresponding security score. Security actions are taken according to a security score assigned according to matching descriptors and analyzed ROM information.

19 Claims, 5 Drawing Sheets

(56) References Cited

U.S. PATENT DOCUMENTS

| | | | |
|---|---|---|---|
| 2006/0218320 A1* | 9/2006 | Avraham | G06F 21/554 710/62 |
| 2009/0313403 A1* | 12/2009 | Cheong | G06F 21/83 710/67 |
| 2010/0138918 A1 | 6/2010 | Kim | |
| 2011/0047305 A1 | 2/2011 | Kim | |
| 2011/0088093 A1 | 4/2011 | Kang | |
| 2011/0265156 A1 | 10/2011 | Bombay | |
| 2012/0311207 A1* | 12/2012 | Powers | G06F 13/385 710/106 |
| 2013/0198717 A1* | 8/2013 | Igelka | G06F 8/71 717/121 |
| 2013/0269043 A1* | 10/2013 | Limaye | G06F 21/10 726/34 |
| 2014/0215637 A1* | 7/2014 | Moore | G06F 21/57 726/27 |
| 2014/0337558 A1* | 11/2014 | Powers | G06F 9/45558 710/313 |
| 2015/0020189 A1* | 1/2015 | Soffer | H01R 13/66 726/16 |
| 2018/0129806 A1 | 5/2018 | Bender | |
| 2018/0152480 A1* | 5/2018 | Kinder | H04L 63/20 |
| 2018/0174069 A1 | 6/2018 | Childress | |
| 2018/0225230 A1* | 8/2018 | Litichever | G06F 21/56 |
| 2018/0270194 A1* | 9/2018 | Beitler | G06F 13/385 |
| 2018/0293376 A1* | 10/2018 | El Abed | G06F 21/85 |
| 2018/0302424 A1 | 10/2018 | Bender | |
| 2018/0324179 A1* | 11/2018 | Hou | G06F 21/51 |
| 2018/0373897 A1* | 12/2018 | Papillon | G06F 21/85 |
| 2019/0042749 A1* | 2/2019 | Appleboum | H04L 67/303 |
| 2019/0155960 A1* | 5/2019 | Nomura | G06F 16/9017 |
| 2019/0286817 A1* | 9/2019 | Butler | G06F 13/4282 |
| 2019/0354677 A1* | 11/2019 | Yamashita | G06F 21/57 |
| 2020/0226298 A1* | 7/2020 | Appleboum | G06F 21/577 |
| 2020/0320023 A1* | 10/2020 | Litichever | G06F 13/107 |
| 2020/0327255 A1* | 10/2020 | Ngo | G06F 21/554 |
| 2020/0356665 A1* | 11/2020 | Denney | G06N 5/04 |
| 2020/0380124 A1* | 12/2020 | Yavuz | G06N 7/005 |
| 2021/0133320 A1* | 5/2021 | Havenga | G06F 21/572 |
| 2022/0341990 A1* | 10/2022 | Moreno | G01R 31/31719 |

FOREIGN PATENT DOCUMENTS

| | | | | |
|---|---|---|---|---|
| CN | 106961361 | * | 7/2017 | H04L 41/00 |
| EP | 2746956 A2 | | 6/2014 | |
| EP | 3179398 A1 | | 6/2017 | |
| GN | 103778081 A | | 5/2014 | |
| WO | 2001010079 A1 | | 2/2001 | |

OTHER PUBLICATIONS

"Libraries Gluing USB Ports a Outdated Endpoint Protect", SentinelOne, Sep. 30, 2016, 2 pages, <https://www.sentinelone.com/blog/outdated-endpoint-protection-solutions/>.

"Make your Own DIY USB Rubber Ducky", Behind the Sciences, May 12, 2017, 2 pages, <https://behindthesciences.com/electronics/make-your-own-diy-usb-rubber-ducky/>.

"Universal Serial Bus (USB)", Device Class Definition for Human Interface Devices (HID), Jun. 27, 2001, 1996-2001 USB Implementers' Forum, 97 pages.

"USB human interface device class", Wikipedia, Jul. 10, 2018, 5 pages, <https://en.wikipedia.org/w/index.php?title=USB_human_interface_device_class&oldid=84971 7673>.

"USB Rubber Ducky—Hak5", web.archive.org, captured Nov. 16, 2018, 2 pages, <https://shop.hak5.org/products/usb-rubber-ducky-deluxe>.

"USB-Rubber-Ducky-Clone-using-Arduino-Leonardo-Beetle", basic4, GitHub, printed on Jan. 16, 2019, 2 pages, <https://github.com/basic4/USB-Rubber-Ducky-Clone-using-Arduino-Leonardo-Beetle>.

Greenberg, Andy, "Why the Security of USB is Fundamentally Broken", Security, Jul. 31, 2014, 8 pages, CNMN Collection, copyright 2018 Conde Nast, <https://www.wired.com/2014/07/usb.security/>.

"Will we ever fix 'broken' USB stick security?", Editor (https://www.welivesecurity.com/author/editorla/) May 20, 2016, 11 pages, <https://www.welivesecurity.com/2016/05/20/will-ever-fix-broken-usb-stick-security/>.

Brody, Hartley, "USB Rubber Ducky Tutorial: The Missing Quickstart Guide to Running Your First Keystroke Payload Hack", Aug. 29, 2017, 11 pages, <https://blog.hartleybrody.com/rubber-ducky-guide/>.

Chang, Hung-Chang, "Based on Standard Descriptors and Dynamic Key Features to Detect Malicious USB Storage Devices in APT", 2017 12th Asia Joint Conference on Information Security, pp. 65-68.

Eaton, Adam, "Building a USB Rubber Ducky for $7—Adam Eaton—Medium", Aug. 7, 2017, 9 pages, <https://medium.com/@EatonChips/building-a-usb-rubber-ducky-for-7-c851aae30a1d>.

Farrell, Nick, "IT Managers glue up USB ports—Cut and past willl fix it", Jul. 4, 2006, The Inquirer, 2 pages, <https://www.theinquirer.net/inquirer/news/1024318/it-managers-glue-up-usb-ports>.

Ingersoll, Geoffrey , "The Biggest Threat to National Security Thumb Drive", Jul. 24, 2013, Business Insider, 3 pages, <https://www.businessinsider.com/the-biggest-threat-to-national-security-is-the-thumb-drive-2013-7>.

Kang, Myung-Gu, "USBWall: A Novel Security Mechanism to Protect Against Maliciously Reprogrammed USB Devices" University of Kansas, 2015. Submitted to the graduate degree program in Electrical Engineering & Computer Science and the Graduate Faculty of the University of Kansas in partial fulfillment of the requirements for the degree of Master of Science, 73 pages.

Loe et al., "SandUSB: An Installation-Free Sandbox For USB Peripherals". Research Center for Information Technology Innovation, Academia Sinica, Taiwan HRL Laboratories, USA, printed on Jan. 16, 2019, 6 pages.

Tian et al. "Defending Against Malicious USB Firmware with GoodUSB". ACSAC '15, Dec. 7-11, 2015, Los Angeles, CA, USA, 10 pages.

"USB Security Solution", Google Search, printed on Jan. 16, 2019, 4 pages.

Zhukov, Anton, "Turning a Regular USB Flash Drive into a USB Rubber Ducky—HackMag", Dec. 9, 2016, 11 pages, <https://hackmag.com/security/rubber-ducky/>.

Patent Cooperation Treaty, PCT, Notification of Transmittal of the International Search Report and The Written Opinion of the International Searching Authority, or The Declaration, Applicant's File Reference P201805520, International Application No. PCT/IB2020/060093, dated Feb. 18, 2021, International filing date Oct. 28, 2020, 10 pages.

Anonymous, "Total USB Security", https://blog.rootshell.be/2007/05/07/total-usb-security/, May 7, 2007, 13 pages.

Anonymous, "USB Rubber Ducky", https://hakshop.com/products/usb-rubber-ducky-deluxe, accessed Apr. 20, 2022, 6 pages.

* cited by examiner

SECURITY SCREENING OF A UNIVERSAL SERIAL BUS DEVICE

BACKGROUND

The present invention relates generally to the field of computer security, and more particularly to securing a computer against keystroke injection tools.

A keystroke injection tool is often used to mimic a keyboard connection to a universal serial bus (USB) port. The USB rubber ducky is a well-known keystroke injection tool disguised as a generic flash drive. Computers recognize it as a regular keyboard and automatically accept its pre-programmed keystroke payloads. The USB rubber ducky merely is plugged in, detected by the computer as a keyboard, and modern operating systems accept the pre-programmed keystrokes from the device.

USB protocols can configure certain devices at startup or when they are plugged in at run time. The USB devices are divided into various device classes for quick handling. Each USB device class defines common behavior and/or protocols for devices serving similar functions. Examples and corresponding classes include: (i) video monitor (display class); (ii) modem (communications class); (iii) speakers (audio class); (iv) hard drive (mass storage class); and (v) data glove (human interface device (HID) class). The USB HID class consists primarily of devices that are used by humans to control the operation of computer systems. Typical examples of USB HID class devices include: (i) keyboards, computer mice, pointing devices, trackballs, and joysticks; (ii) controls such as remote controls, games, simulation devices (data gloves, throttles, steering wheels, and pedals); and (iii) other input devices including: bar-code readers, thermometers, or voltmeters.

SUMMARY

In one aspect of the present invention, a computer-implemented method includes: (i) identifying a set of descriptors from descriptor fields on a universal serial bus (USB) device; (ii) comparing each descriptor of the set of descriptors with a set of historic descriptors, the set of historic descriptors being individually assigned a security score; (iii) reading read-only memory (ROM) information on the USB device; (iv) analyzing the ROM information for congruity wherein a non-congruity is assigned a pre-defined security score; (v) assigning a security score to the USB device based on the comparing each descriptor and analysis of the ROM information, the highest individual security score being the basis of the assigned security score; and (vi) responsive to the assigned security score, taking a security action.

In another aspect of the present invention, a computer-implemented method includes: (i) reading read-only memory (ROM) information on a universal serial bus (USB) device; (ii) identifying, in the ROM information, a set of trails of configuration files; (iii) identifying a set of indicators of compromise including pre-determined trails of configuration files; (iv) determining a trail of the set of trails matches a pre-determined trail in the set of indicators of compromise; (v) identifying a security score associated with the pre-determined trail; and (vi) taking a security action corresponding to the security score.

In yet another aspect of the present invention, a computer-implemented method includes: (i) identifying a set of device drivers stored on a universal serial bus (USB) device; (ii) identifying a set of microcontroller device drivers; (iii) determining a device driver of the set of device drivers on the USB device matches a microcontroller device driver of the set of microcontroller device drivers; (iv) identifying a security score associated with the matching microcontroller device driver; and taking a security action corresponding to the security score.

DETAILED DESCRIPTION

Figure 1:
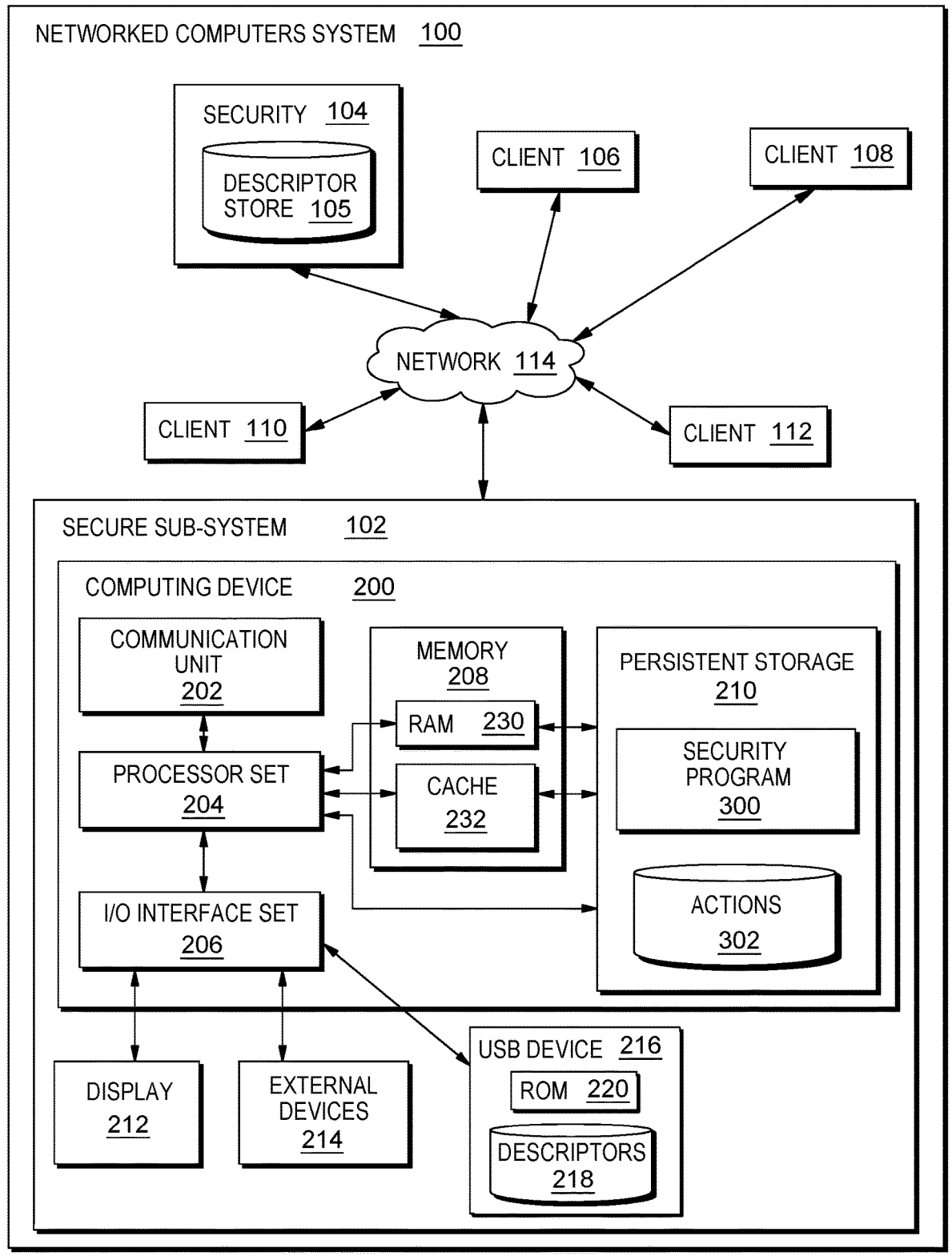
FIG. 1 is a schematic view of a first embodiment of a system according to the present invention.

Universal serial bus (USB) devices are evaluated for access according to characteristics including descriptors and ROM information. Descriptors are cross-references to historic descriptors known to be associated with malicious or approved USB devices. ROM information is analyzed to determine congruity of data. Device drivers and configuration files on the USB device are reviewed for indicators of compromise or threat and assigned a corresponding security score. Security actions are taken according to a security score assigned according to matching descriptors and analyzed ROM information. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: secure sub-system 102; security sub-system 104; historic descriptor store 105; client sub-systems 106, 108, 110, 112; communication network 114; computing device 200; communication unit 202; processor set 204; input/output (I/O) interface set 206; memory device 208; persistent storage device 210; display device 212; external device set 214; USB memory device 216; USB descriptors store 218; ROM 220; random access memory (RAM) devices 230; cache memory device 232; security program 300; and security actions store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. USB memory device 216 will typically be portable computer readable storage media such as, for example, a thumb drive, a portable optical or magnetic disk, or a memory card. Software and data used to practice embodiments of the present invention, for example, program 300, can be stored on such portable computer readable storage media, such as USB descriptors store 218. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Security program 300 operates to identify USB threats at the time the USB device is plugged into the USB interface of the computer. Reference is made to certain characteristics of legitimate and/or malicious USB devices. Upon matching at least one target characteristic with the USB device, decisions are made regarding the likelihood that the USB device is safe for allowing access to the computer system.

Some embodiments of the present invention recognize the following facts, potential problems and/or potential areas for improvement with respect to the current state of the art: (i) the USB rubber ducky has a simple scripting language, formidable hardware, and covert design; (ii) nearly every computing device from desktop to smartphone accepts human input from keyboards; (iii) the ubiquitous USB HID standard makes nearly universal use possible; (iv) conventional approaches to address threats from USB HID simulation is to disable USB ports reverting back to hard wired computer mice and keyboards; and/or (v) it is very easy to convert a traditional USB storage device into a keystroke injection tool.

Some embodiments of the present invention are directed to providing a system and method to fix some vulnerabilities on the human interface device (HID) class of devices.

Some embodiments of the present invention introduce a set of extensions to the HID class of devices that resists attacks from non-HID devices such as the USB rubber ducky while maintaining viability of the USB ports on computing devices.

Security screening may be accomplished with respect to the various descriptors stored on USB devices and readable when plugged into a USB port on a computing device. Some embodiments of the present invention use descriptors to identify potential USB HID threats. Standard USB device descriptor fields may include, for example: (i) class; (ii) subclass; (iii) vendor; (iv) product; and/or (v) version.

Some embodiments of the present invention compare the USB descriptor fields of a new USB device to a list of potentially dangerous USB descriptors historically found on malicious devices. Descriptors such as "USB Rubber Ducky" or "Bad-USB" may allow a system to determine that the inserted device is a dangerous USB device. If the descriptor field "bCountryCode" is often the same on USB devices used as keystroke injection tools, that descriptor field would be a good parameter for identifying those malicious devices. Additionally, some embodiments of the present invention are configured to include or exclude some descriptor fields as required by the administrator to, for example, reduce false positives.

Some embodiments of the present invention consider functional characteristics associated with a class of devices. The HID standard uses a descriptor, or class, to determine the function of a device. Descriptors that indicate function include: audio device, input device, and mass storage device. Additionally, the HID standard uses protocols to handle different classes of devices, for example protocol 1 may be applied to a keyboard device and protocol 2 may be applied to a mouse device.

Some embodiments of the present invention are directed to making a determination on the likelihood that an HID class device is being simulated by another, possibly malicious device. By collecting information from any newly connected USB device, the information may be cross-referenced against a database having descriptors or other information identifying known malicious USB devices. When a match is made with the database, a security score is applied. In some embodiments, the security score is numeric and applies individually to each match made. In some embodiments, for each matching descriptor identified, a corresponding confidence score is applied to the device. The aggregate confidence score is used to determine a responsive action. For example: (i) if confidence level=100, then block the port and trigger alert (user, management, security); (ii) if confidence level=100, then block the user; (iii) if confidence level>75, trigger alert to user; and/or (iv) if confidence level>75, send a security event (such as a security information and event management (SIEM) product). In that way, the sum of the individual security scores provide for the determination of a confidence level for the newly connected USB device. Additionally, some embodiments of the present invention are configured to include or exclude some descriptor fields to, for example, reduce false positives.

Some embodiments of the present invention are directed to identifying malicious USB devices by checking trails on a USB random access memory (ROM). Information is read from the ROM to create a set of correlations to determine if a USB device was modified, or hacked, and converted into a "Bad-USB" or any other type of malicious code injector. For example: (i) if the field "manufacturer" is Acme and Acme only manufacture mass storage USB, but the installed device is configured as an input device (keyboard); and (ii) if the code in the ROM is related to a mass storage USB device, but the installed device is configured as an input device (keyboard).

When any alteration on the USB device is detected, a course of action will begin, the actions including: (i) analyzing the potential threat to create a confidence level of the possible danger of the USB device; and (ii) executing a given set of security actions based on the confidence level.

Some embodiments of the present invention execute security-related tasks before loading the drivers and/or executing code on the firmware of the USB device. By following this course of action, some embodiments of the present invention prevent malicious code from entering the computing device.

Some embodiments of the present invention resist receipt of unwanted code injection with precautions that include: (i) the use of confidence levels to determine an appropriate security action to be performed; (ii) the use of HID Classes to determine the original function of a USB device when inserted into a USB port; (iii) the correlation of the metadata obtained from the USB HID class device against an action performed by the device; (iv) the scan of trails of known configuration file threats on the USB device; and/or (v) the scan of trails from the device ROM (device manufacturer) to correlate the data obtained against the function of the USB device.

Figure 2:
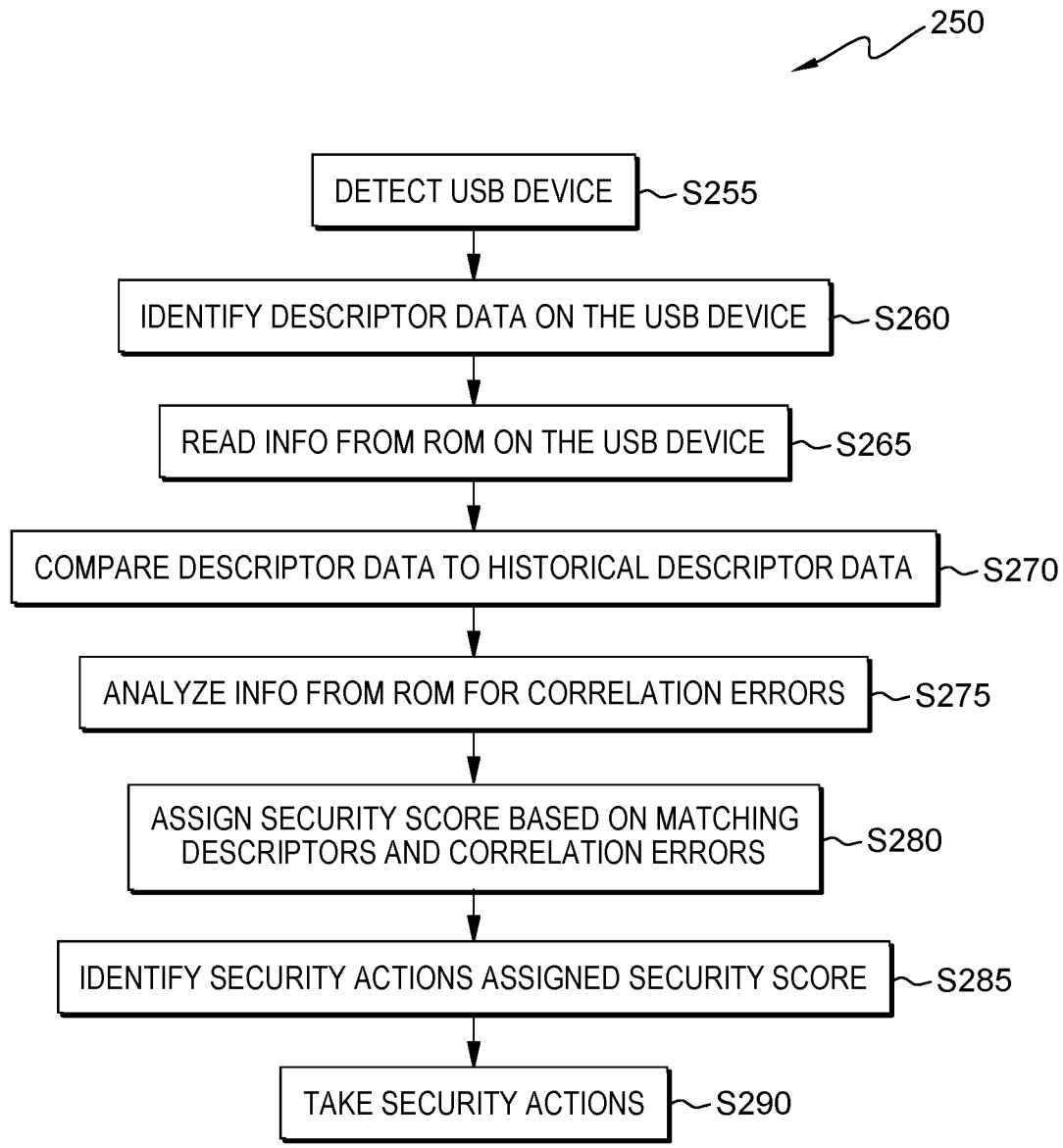
FIG. 2 is a flowchart showing a method performed, at least in part, by the first embodiment system.
Figure 3:
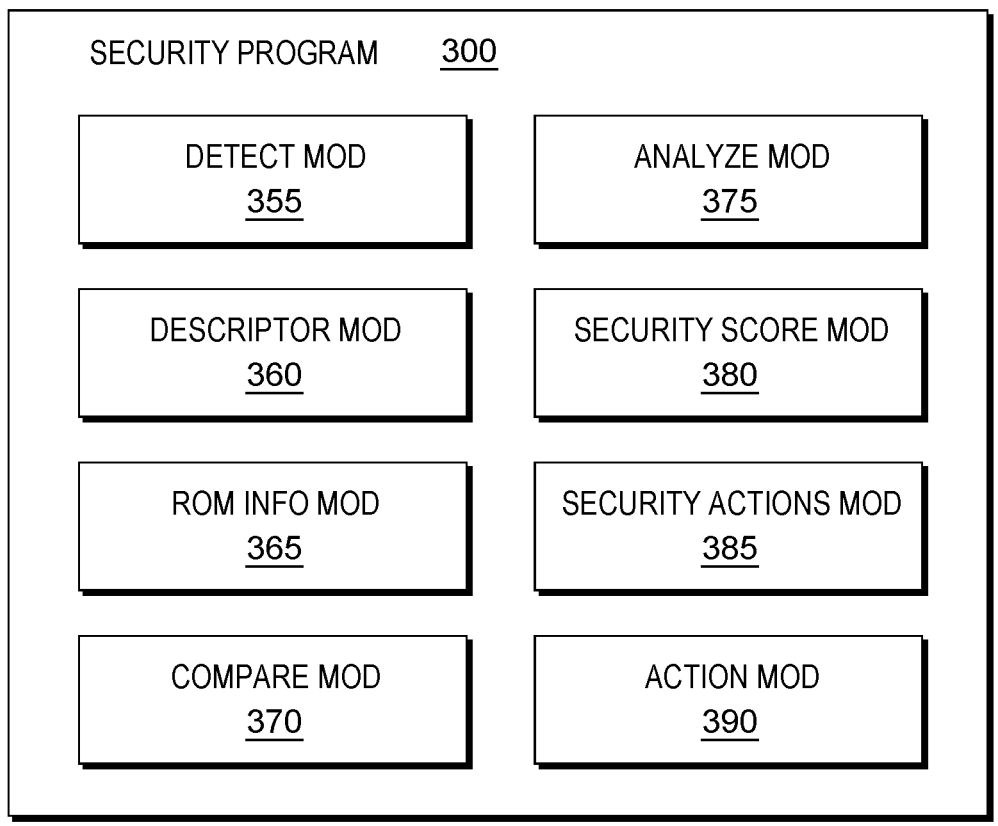
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where detect module ("mod") 355 detects a USB device is inserted into a USB port. In this example, USB device 215 is inserted into I/O interface 206 of computing device 200 (FIG. 1). Upon detecting the insertion of a USB device into the USB port, detect mod holds automatic reading or processing the USB device while triggering a series of evaluation steps that follow. Evaluation is performed to determine whether or not to grant access to the USB device for the operations on the computing device. In that way, a USB device is effectively cleared for access.

Processing proceeds to step S260, where descriptor mod 360 identifies descriptor data on the USB device. Descriptor data stored, for example, in USB descriptors store 218 (FIG. 1) include populated data fields identifying the USB device. Data fields for descriptors may include, but are not limited to: (i) class; (ii) subclass; (iii) vendor; (iv) product; and/or (v) version.

Processing proceeds to step S265, where ROM information mod 365 reads information from the ROM on the USB device. In this example, ROM 220 includes ROM information about USB device 216. Information of interest on the ROM includes, but is not limited to: (i) manufacturer; (ii) program code; (iii) configuration data; and/or (iv) modification trail data.

Processing proceeds to step S270, where compare mod 370 compares descriptor data to historical descriptor data. In this example, historical descriptor data is stored in descriptor store 105 on security sub-system 104 (FIG. 1). Historical descriptor data is associated with either passing or failing indicators. Passing indicators suggest that the associated USB device is not a suspect device. Failing indicators suggest that the associated USB device is a suspect device. For each descriptor stored in the database, a security score is assigned. When a matching descriptor is found, the associated security score may be used in calculating the security score of the USB device. Historical descriptor data is based on known malicious and not-malicious USB devices. Certain descriptors often found to be associated with malicious USB devices is recorded in the database. Further, in some embodiments, certain descriptors often found on legitimate USB devices is recorded along with a security score indicative of a positive result, or secure device.

Processing proceeds to step S275, where analyze mod 375 analyzes ROM information for correlation errors. Correlation errors may refer to failure to align one piece of ROM information with another, such as a manufacturer being identified who does not make the class of USB device represented by the descriptor data collected in step S260 or represented in the ROM information. Other correlation errors are found when analysis reveals that program code is not related to the class of USB device represented by the descriptor data collected in step S260 or represented in the ROM information. Correlation errors may also be indicated by a level of congruity in the ROM information. This level may reflect a simple two-part test, congruent or not congruent. Alternatively, a degree of congruity is considered, and a corresponding security score reflects the degree of congruity.

Processing proceeds to step S280, where security score mod 380 assigns a security score to the USB device based on matching descriptors and correlation errors. For each matching descriptor, the corresponding security score is associated with the USB device. In this example, the security score is numeric such that multiple security scores may produce a sum, or aggregate security score. Alternatively, the security score is taken alone for each matching descriptor and a highest ranked security score is the basis for granting or denying access to the computing system. Correlation errors may also be associated with a security score. When correlation errors generate security scores, the score may be included in the sum for determining an aggregate security score. Alternatively, any correlation error results in a particular security score that is then ranked along with the other security scores identified from the matching descriptors and action is taken according to the highest-ranking security score.

Processing proceeds to step S285, where security actions mod 385 identifies security actions for the assigned security score. In this example, security actions are correlated to security scores in security actions store 302 (FIG. 1). In some embodiments, a range or relatively low scores lead to a set of security actions and a range of relatively high scores lead to another set of security actions. In some embodiments each possible score is associated with a set of security actions. Such an embodiment would work well where the highest-ranking score is the security score and would precisely correlate to a particular set of security actions. Where aggregate security scores are used, the application of ranges of values may be found to be easier to practice.

Processing ends at step S290, where action mod 390 takes the identified set of security actions. Various security actions may be grouped together in a set of security actions such that more than one action is taken. Security actions include, but are not limited to: (i) blocking the USB port; (ii) sending an alert to the user; (iii) sending an alert to a designated security office; (iv) blocking access to a user associated with the USB device; (v) generating a security event via a STEM product; (vi) allowing access to the computing system; and/or (vii) granting limited access to particular functions/operations of the computing system.

Figure 4:
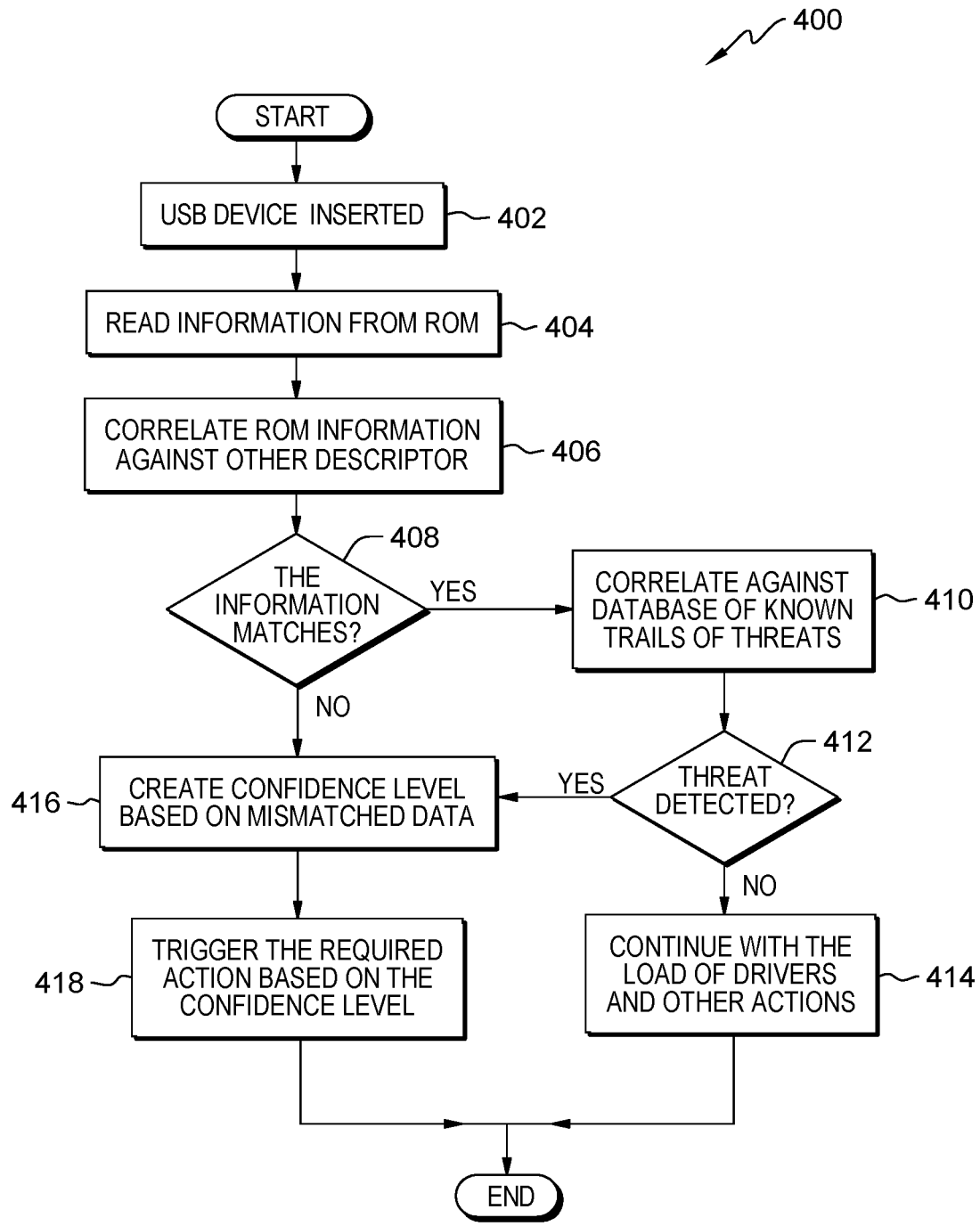
FIG. 4 is a flowchart view of a second embodiment of a method according to the present invention.

FIG. 4 shows flowchart 400 depicting a second method according to an embodiment of the present invention. This method may be implemented on networked computers system 100 (FIG. 1) or other computing systems known in the art.

Processing begins at step 402, where a USB device is inserted into a USB port. When the USB device is inserted, the computing system operating according to some embodiments of the present invention detects the insertion and initiates the process of determining whether or not to load drivers or allow operations or actions to be taken by the USB device.

Processing proceeds to step 404, where information is read from the ROM on the inserted USB device.

Processing proceeds to step 406, where the read information is correlated against other ROM information and any USB device descriptors. A failure of correlating the read information within itself and with device descriptors is a strong indication that the USB device has been altered.

Processing proceeds to step 408, where a determination is made as to whether the information available on the USB device matches or is congruent. If congruent, processing proceeds to step 410. If not congruent, processing proceeds to step 416.

Following the "yes" branch, processing proceeds to step 410, where the read information is correlated against a database of known configuration files, morphing indicators of compromise, of USB devices that should not be given access to the computing system. Example files include: "script.bin" files; ".ino" files; ".h" files; and ".cpp" files.

Processing proceeds to step 412, where a determination is made as to whether or not a correlation to known threats is determined or detected. If yes, processing proceeds to step 416. If not, processing proceeds to step 414.

Following the "no" branch, processing ends at step 414, where the computing system proceeds to continue with the load of drivers and other actions accepting the USB device as legitimate and not a threat to security.

Referring now to the "no" branch from step 408, processing proceeds to step 416. It should be noted also that the "yes" branch from step 412 also proceeds to step 416. At step 416, the computing system creates a confidence level for the USB device based on the mismatched data. In some embodiments of the present invention, the confidence level is adjusted according to a degree of mismatch. Alternatively, any degree of mismatch receives one confidence level and a lack of mismatch receives another confidence level.

Processing ends at step 418, where a required action is triggered according to the confidence level created at step 416. Some embodiments of the present invention apply pre-defined actions for each confidence level. In that way, the confidence level is aligned with a particular required action, so that action is taken automatically upon determination of the confidence level. Alternatively, a confidence level is reported to a user for corrective action.

Figure 5:
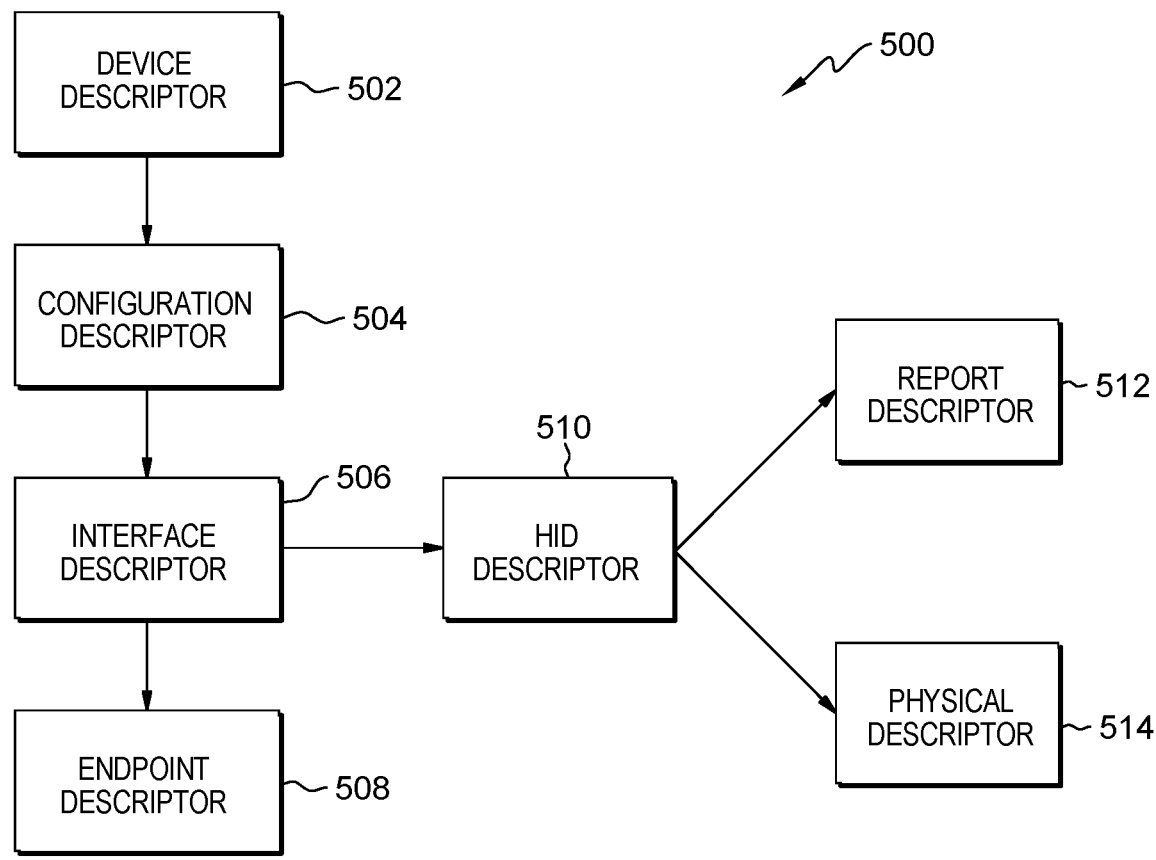
FIG. 5 is a flowchart view of a third embodiment of a method according to the present invention.

FIG. 5 shows flowchart 500 depicting descriptor-based processing of a human interface device (HID) for determining a confidence level that an inserted USB device is actually an HID device and not a threat. A USB storage device emulating an HID device would be detected with reference to the descriptors and would be blocked from access to the computing system. It should be noted that a USB device may have only one or multiple configurations on the configuration descriptor. The class of the USB device is defined on the interface descriptor.

Processing begins at step 502 where the device descriptor is retrieved from the USB device.

Processing proceeds to step 504 where the configuration descriptor is retrieved from the USB device.

Processing proceeds to step 506 where the interface descriptor is retrieved from the USB device. The interface descriptor, in addition to disclosing the class of device, includes usage data that may be helpful in identifying the type of device being inserted into the USB port.

Processing proceeds to step 510 where the human interface descriptor (HID) is identified from the interface descriptor data retrieved in step 506. The HID descriptor is a hard-coded array of bytes that describe data packets. The data packets data includes: how many packets the device supports, how large are the packets, and the purpose of each byte and bit in the packet.

Processing proceeds to step 512 where the report descriptor of the HID. HID devices send data to the host computing device using reports. The report descriptor tells the host computing device how to interpret the data sent by the HID.

Processing proceeds to step 514 where the physical descriptor of the HID. HID usages are organized into usage pages of related controls. The usage page and usage ID define a unique constant that describes a particular type of control including whether the device is a physical input device (PID).

Processing ends at step 508 where the endpoint descriptor is retrieved from the USB device. An endpoint descriptor includes information including: endpoint address, type, direction, and amount of data the endpoint can handle. The data transfers to the endpoint are based on that information.

Some embodiments of the present invention are directed to detecting a USB device that has been altered or hacked. Those devices that are altered are deemed to be suspect and will not be allowed access to the computing system. Some embodiments of the present invention use functional characteristics and USB device classes to detect suspect USB devices. Some embodiments of the present invention use the non-volatile data in the ROM to determine if a USB device was hacked and modified. If deemed to be hacked, the USB device is not permitted access to the computing system. Some embodiments of the present invention are directed to using USB device descriptors stored in ROM to determine if the connected USB device is a suspect code injector not to be granted access. Some embodiments of the present invention are directed to creating a confidence score to determine a probability of a threat from the installed USB device. Some embodiments of the present invention use the confidence score to determine the security action to be trigger. A correlation between confidence score and security action is stored for taking pre-determined security actions automatically upon determining the confidence score. Additionally, some embodiments enable inclusion and/or exclusion of certain factors in determining a confidence score.

Some embodiments of the present invention are directed to a method for determining whether a microcontroller is being used to emulate a keyboard, the method comprising: detecting that a USB device has been connected to a computer system; and triggering a predetermined security action if one or more of the following occur: (i) the USB device is determined to have a certain number (or percentage) of USB descriptors that do not match known USB descriptors for keyboards; (ii) the USB device is determined to have a device driver that matches a known device driver for a microcontroller device (e.g., an Arduino device such as CH3430, FT232RL, ATMEGA16u2, and ATMega32U4); and (iii) a keyboard device driver is detected as being connected to the computer system within a predetermined time window (e.g., 10 seconds) after the USB device is detected. The duration of the time window supports an inference that the USB device is a keyboard. Alternatively, a delay for the duration of the time window before granting access to the USB device, which presents itself as a keyboard device, provides an opportunity for an additional keyboard device to be detected, leading to an inference that one of the two is merely a simulation of a keyboard and further analysis of the devices should be performed.

Some embodiments of the present invention are directed to a method for determining whether a USB device has been tampered with, the method comprising: detecting, by a computer, that a USB device has been inserted into a USB port of the computer; reading, by the computer, USB device descriptors of the USB device and Read Only Memory (ROM) information of the USB device; in response to determining that the USB device descriptors and the ROM information are consistent with each other, comparing the USB device descriptors to a database of known dangerous USB device descriptors; and in response to determining that the USB device descriptors do not match any of the known dangerous USB device descriptors, loading, by the computer, the device drivers for the USB device and allowing the USB device to be accessed by a user of the computer.

Some embodiments of the present invention are directed to a method for determining whether a USB device has been tampered with, the method comprising: in response to determining that the USB device descriptors and the ROM information are not consistent with each other, determining a confidence level of malicious activity based on the difference between the USB device descriptors and the ROM information, and in response to the confidence level exceeding a threshold, triggering a security action prior to the computer loading the device drivers for the USB device.

Some embodiments of the present invention are directed to a method for determining whether a USB device has been tampered with, the method comprising: in response to determining that the USB device descriptors match known dangerous USB device descriptors, determining a confidence level of malicious activity based on the amount of the match between the USB device descriptors and the known dangerous USB device descriptors; and in response to the confidence level exceeding a threshold, triggering a security action prior to the computer loading the device drivers for the USB device.

Some embodiments of the present invention may include one, or more, of the following features, characteristics and/or advantages: (i) stops the injection of code before the injection starts, effectively eliminating the risk of the computing device being infected; and/or (ii) works with any known threats that convert standard USB thumb drives into a code injection tool.

Some embodiments of the present invention are directed to a computer program product comprising a computer-readable storage medium having a set of instructions stored therein which, when executed by a processor, causes the processor to take security actions according to a security score by: identifying a set of descriptors from descriptor fields on a universal serial bus (USB) device; comparing each descriptor of the set of descriptors with a set of historic descriptors, the set of historic descriptors being individually assigned a security score; reading read-only memory (ROM) information on the USB device; analyzing the ROM information for congruity wherein a non-congruity is assigned a pre-defined security score; assigning a security score to the USB device based on the comparing each descriptor and analysis of the ROM information, the highest individual security score being the basis of the assigned security score; and responsive to the assigned security score, taking a security action.

Some embodiments of the present invention take security actions according to a security score by detecting the USB device inserted into a USB port.

Some embodiments of the present invention are directed to security actions granting access to the computing system.

Some embodiments of the present invention are directed to security actions blocking the USB port from use by the USB device.

Some embodiments of the present invention are directed to assigning a security score to the USB device includes aggregating the assigned security scores for each historic descriptor matching a descriptor in the set of descriptors to generate a combined security score for the USB device.

Some embodiments of the present invention are directed to taking security actions according to a security score by determining the security action by reference to a table associating a set of security actions, including the security action, with ranges of values of combined security scores, including the combined security score.

Some embodiments of the present invention are directed to a computer system comprising: a processor(s) set; and a computer readable storage medium having program instructions stored therein; wherein: the processor set executes the program instructions that cause the processor set to take security actions according to a security score by: identifying a set of descriptors from descriptor fields on a universal serial bus (USB) device; comparing each descriptor of the set of descriptors with a set of historic descriptors, the set of historic descriptors being individually assigned a security score; reading read-only memory (ROM) information on the USB device; analyzing the ROM information for congruity wherein a non-congruity is assigned a pre-defined security score; assigning a security score to the USB device based on the comparing each descriptor and analysis of the ROM information, the highest individual security score being the basis of the assigned security score; and responsive to the assigned security score, taking a security action.

Some Helpful Definitions Follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   identifying a set of descriptors from descriptor fields on a universal serial bus (USB) device;
   comparing each descriptor of the set of descriptors with a set of historic descriptors, the set of historic descriptors being individually assigned a first security score;
   reading read-only memory (ROM) information on the USB device;
   analyzing the ROM information for congruity wherein a non-congruity is assigned a pre-defined security score;
   assigning a second security score to the USB device based on the comparing each descriptor and analysis of the ROM information, the second security score based in part on aggregating the assigned first security scores for each historic descriptor matching a descriptor in the set of descriptors to generate a combined security score for the USB device; and
   responsive to assigning the second security score, taking a security action.

2. The computer-implemented method of claim 1, wherein the security action is granting access to the computing system.

3. The computer-implemented method of claim 1 further comprising:
   detecting the USB device inserted into a USB port.

4. The computer-implemented method of claim 3, wherein the security action is blocking the USB port from use by the USB device.

5. The computer-implemented method of claim 1, further comprising:
   determining the security action by reference to a table associating a set of security actions, including the security action, with ranges of values of combined security scores, including the combined security score.

6. A computer-implemented method comprising:
   reading read-only memory (ROM) information on a universal serial bus (USB) device;
   identifying, in the ROM information, a set of trails of configuration files;
   determining a trail of the set of trails matches a pre-determined trail of a known configuration file threat;
   identifying a security score associated with the pre-determined trail; and
   taking a security action corresponding to the security score.

7. The computer-implemented method of claim 6, further comprising:
   determining the security action by reference to a table associating a set of security actions, including the security action, with a range of security scores, including the security score.

8. The computer-implemented method of claim 6, further comprising:
   detecting the USB device inserted into a USB port.

9. The computer-implemented method of claim 8, wherein the security action is blocking the USB port from use by the USB device.

10. A computer-implemented method comprising:
    identifying a set of device drivers stored on a universal serial bus (USB) device;
    determining a device driver of the set of device drivers on the USB device matches a known device driver for a microcontroller device;
    identifying a security score associated with the matching microcontroller device driver; and
    taking a security action corresponding to the security score.

11. The computer-implemented method of claim 10, further comprising:
    determining the security action by reference to a table associating a set of security actions, including the security action, with a range of security scores, including the security score.

12. The computer-implemented method of claim 10, further comprising:
    detecting the USB device inserted into a USB port.

13. The computer-implemented method of claim 10, wherein the security action is blocking the USB port from use by the USB device.

14. The computer-implemented method of claim 10, wherein the known device driver comprises a driver for one of: CH3430; FT232RL; ATMEGA16u2; and ATMega32U4.

15. The computer-implemented method of claim 6, wherein the pre-determined trails of configuration files are associated with "script.bin" files.

16. The computer-implemented method of claim 6, wherein the pre-determined trail is associated with ".ino" files.

17. The computer-implemented method of claim 6, wherein the pre-determined trail is associated with ".h" files.

18. The computer-implemented method of claim 6, wherein the pre-determined trail is associated with ".cpp" files.

19. The computer-implemented method of claim 6, wherein the pre-determined trail is associated with one or more selected from a group consisting of: "script.bin" files; ".ino" files; ".h" files; and ".cpp" files.

* * * * *